United States Patent [19]
Brown et al.

[11] Patent Number: 5,242,361
[45] Date of Patent: Sep. 7, 1993

[54] ROLLER MECHANISM FOR AXIALLY LOCATING THE SHELL OF A SELF-LOADING CONTROLLED DEFLECTION ROLL

[75] Inventors: Dale A. Brown, Milton; Arnold J. Roerig, Beloit, both of Wis.

[73] Assignee: Beloit Technologies, Inc., Wilmington, Del.

[21] Appl. No.: 977,364

[22] Filed: Nov. 17, 1992

[51] Int. Cl.⁵ .............................................. B21B 13/02
[52] U.S. Cl. .................................... 492/7; 492/10; 492/20
[58] Field of Search ..................... 492/5, 6, 7, 10, 20, 492/21

[56] References Cited

U.S. PATENT DOCUMENTS

| | | | |
|---|---|---|---|
| 3,494,675 | 2/1970 | Hold et al. | 492/7 X |
| 4,447,940 | 5/1984 | Appenzeller et al. | 492/7 |
| 4,821,384 | 4/1989 | Arav | 29/113 |
| 4,864,703 | 9/1989 | Biondetti et al. | 29/116 |
| 4,907,329 | 3/1990 | Boulot | 29/116 |
| 5,060,357 | 10/1991 | Roerig et al. | 29/113 |
| 5,084,137 | 1/1992 | Ilmarinen et al. | 492/5 X |
| 5,119,542 | 6/1992 | Küsters et al. | 492/6 |

FOREIGN PATENT DOCUMENTS

| | | | |
|---|---|---|---|
| 2423084 | 1/1975 | Fed. Rep. of Germany | 492/7 |
| 9019006 | 1/1984 | Japan | 492/7 |

*Primary Examiner*—Timothy V. Eley
*Assistant Examiner*—C. Richard Martin
*Attorney, Agent, or Firm*—Dirk J. Veneman; Raymond W. Campbell; Gerald A. Mathews

[57] ABSTRACT

A self-loading controlled deflection roll for forming a controlled pressure nip with another roll along a nip line with a hollow rotatable roll shell rotatable on an axis and a roll shaft extending through the shell and radially supporting the shell along the nip line with axially facing surfaces on the shaft and rollers rolling on said surfaces supported on the rotating roll shell accommodating bending of the roll shaft relative to the roll shell fixing their relative axial positions. One roller is axially fixed and the other roller is mounted on a rocker arm loaded with the piston and cylinder.

14 Claims, 3 Drawing Sheets

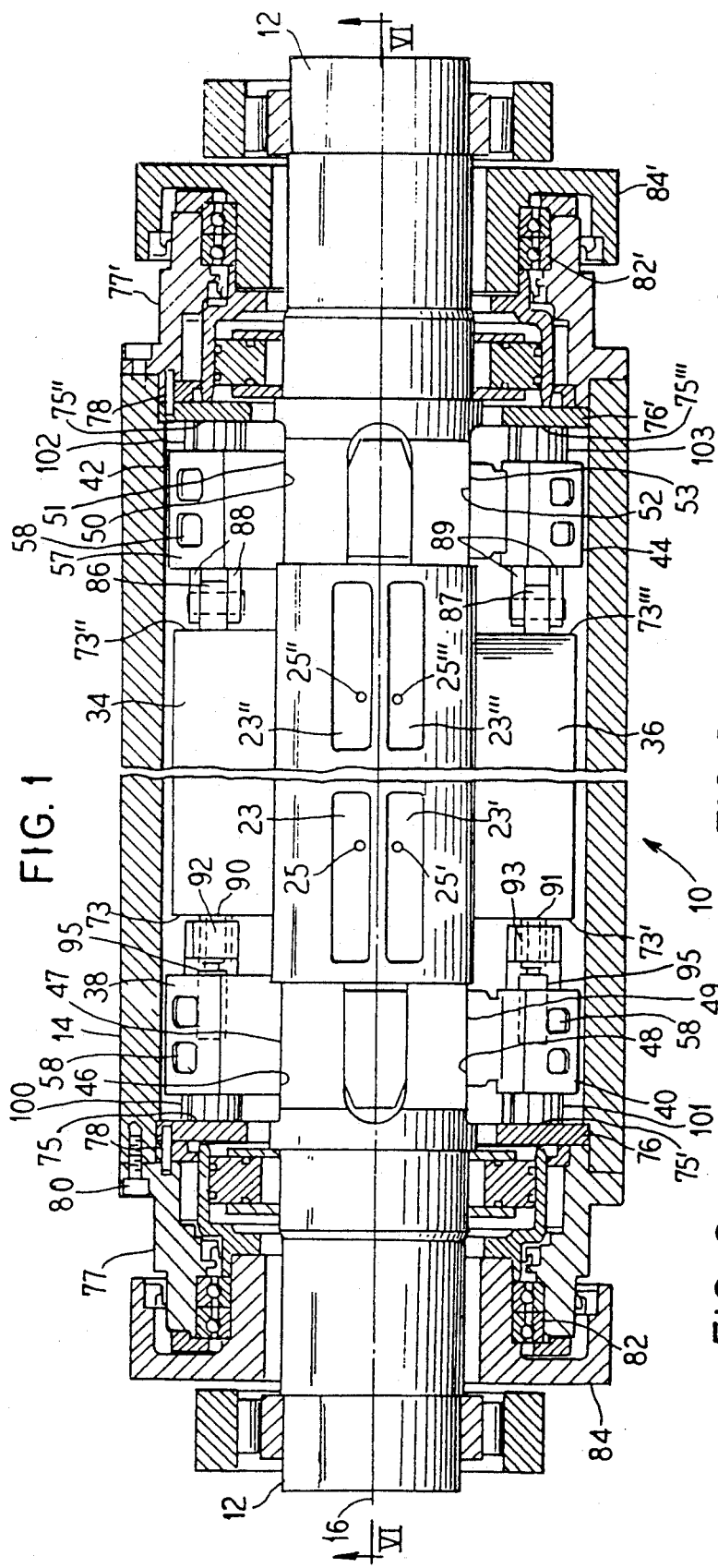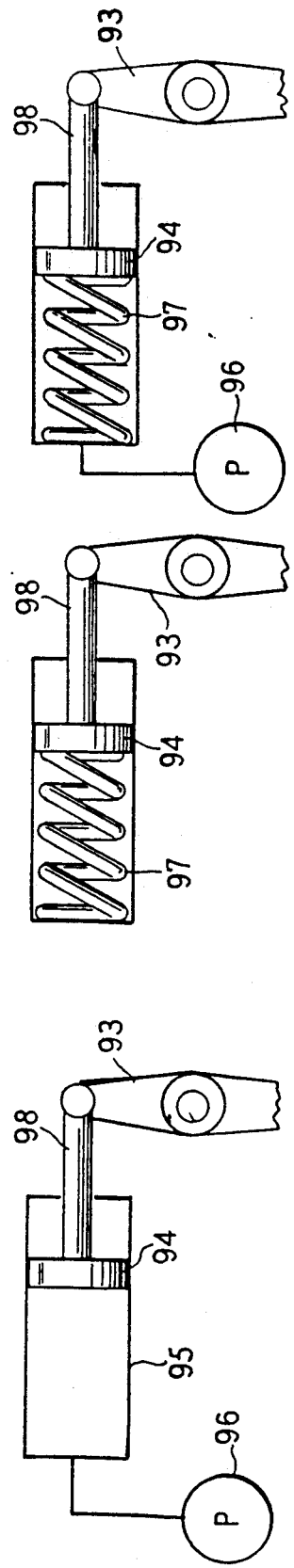

ROLLER MECHANISM FOR AXIALLY LOCATING THE SHELL OF A SELF-LOADING CONTROLLED DEFLECTION ROLL

BACKGROUND OF THE INVENTION

The invention relates to improvements in controlled deflection rolls such as used in papermaking machines.

More particularly, the invention relates to a self-loading type of controlled deflection roll wherein a roll shell is journalled on a shaft having means for supporting the shell along the nip line, and a unique and particular structure is provided for preventing axial displacement of the shell relative to the shaft.

Controlled deflection rolls of various designs have been utilized in the art, including those disclosed in U.S. Pat. Nos. 4,821,384 of Arav et al and 5,060,357 to Roerig et al. In these patents, the roll shell is hydrostatically supported in the direction of its nip formed with another roll such as by a plurality of shoes which are aligned longitudinally along the length of the stationary support shaft. Various structural arrangements are utilized to permit deflection of the roll shaft as it supports the roll shell. In addition to stabilization in the rotary direction, stabilization of the rotating roll shell relative to the shaft must be obtained in an axial direction. Arrangements heretofore used, such as those disclosed in U.S. Pat. No. 5,060,357, involve providing relatively extensive equipment which is carried within the roll shell and cannot easily be serviced. These arrangements use hydraulic pistons between the stationary center shaft and stabilizing side shoes to provide for axial misalignments and differential linear expansion between the roll shell and the center shaft. Such pistons and hydrostatic bearing pads must be activated at all times during operation of the roll. This, in addition to requiring complicated expensive equipment, adds to the total power requirements in order to provide for the necessary fluid flow. Also, there is the disadvantage of the shell not being held axially when the hydraulic system is not operating.

Accordingly, it is an object of the present invention to provide an improved axial alignment-maintaining means between a rotating roll shell and its supporting shaft which avoids disadvantages heretofore in mechanisms available.

A further object of the invention is to provide an axial alignment-maintaining means between a controlled deflection roll shell and its supporting shaft eliminating requirements for hydraulic pressures to be piped within the roll shell and providing mechanisms which have reliable, long operating life.

SUMMARY OF THE INVENTION

The disadvantages and deficiencies of prior types of axial alignment or stabilizing means in a controlled deflection roll have been eliminated. In the present arrangement, mechanical elements have been utilized for axial stability. In one form, vertical opposed surfaces are provided on the supporting shaft, which surfaces extend transverse to the nip line and extend vertically where the vertical nip is applied. These surfaces are engaged by rollers which accommodate relative movement between the roll shell and shaft as it bends with load. The roller in one axial direction rotates on a fixed axis extending transversely of the nip and the other roll on a movable axis. The movable axis is pressure loaded, such as by being carried on a rocker arm and such as by being spring loaded or piston and cylinder loaded.

Other objects, advantages and features, as well as equivalent structures which are intended to be covered herein, will become more apparent with the teaching of the principles of the invention in connection with the disclosure of the preferred embodiments thereof in the specification, claims and drawings, in which:

BRIEF DESCRIPTION OF THE DRAWINGS

FIG. 1 is a sectional view taken through the axis of the controlled deflection roll viewing the roll facing the nip line.

FIGS. 2, 3 and 4 are illustrations of various structures for applying an axial force to an axial alignment roller, the function of which will become more apparent with the description in the specification.

DESCRIPTION OF THE PREFERRED EMBODIMENTS

Figure 5:
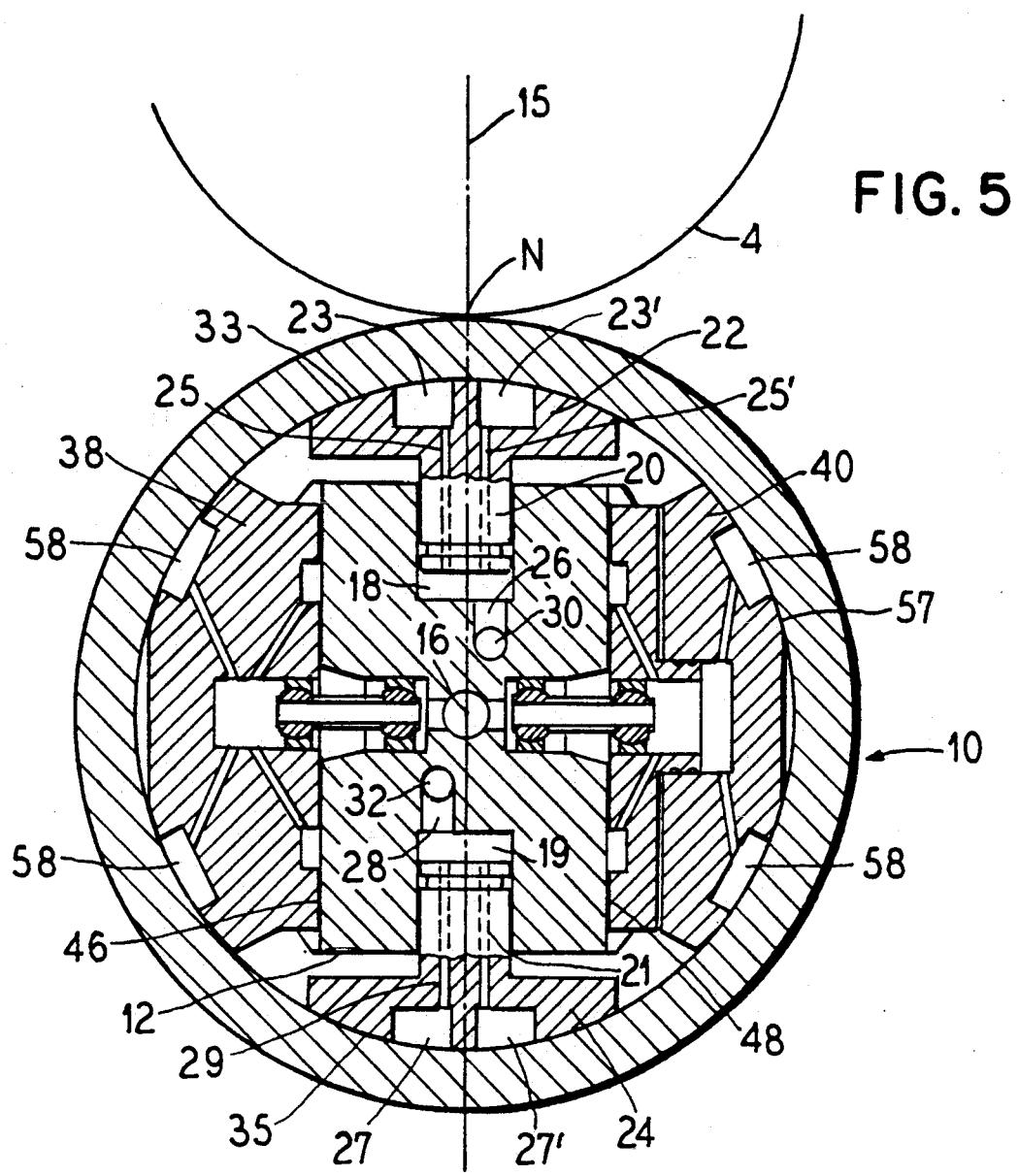
FIG. 5 is a sectional view taken across the axis of the controlled deflection roll of FIG. 1.

As shown in FIG. 1, a self-loading controlled deflection roll 10 has a center stationary support shaft 12 and a hollow cylindrical roll shell 14. In such a self-loading roll, the roll shell is intended to be moved translationally into nipping engagement with another roll 4 along a nip line of contact N in a nip plane 15 through the nip line N and the longitudinal axis 16 of the roll 10, which nip plane is shown more clearly in FIG. 5. In other words, in FIG. 1, the nip plane is shown as a line coincident with the longitudinal axis 16, while in FIG. 5, the nip plane 15 is shown as a vertical line having both the nip line N and the longitudinal axis 16 in the plane.

Referring to FIGS. 1 and 5, support shaft 12 has one or more hydraulic chambers, or cylinders, 18,19 formed in it on opposed sides to receive the piston ends 20,21 of opposed support shoes 22,24 which extend toward and away from nip N along the nip plane. These support shoes are hydraulically actuated by pressurized hydraulic fluid which is supplied to conduits 26,28 and then to the chambers from an outside source, such as a pump (not shown) via central load shoe conduits 30,32. Support shoes 22,24 have support faces 33,35 which bear against, and thus support, the roll shell and load it into and out of nipping engagement along the nip plane by supplying pressurized hydraulic fluid to the one or more support shoes 22,24 along one side, such as the lower side shown in FIG. 5, while permitting the evacuation of pressurized fluid from the hydraulic chamber, or cavities, supplying the single support shoe 22 shown in the upper side of the roll shown in FIG. 5. It is not illustrated, but well-known to the artisan, to replace the single support shoes 22,24 shown with multiple, longitudinally aligned, shoes which may be either the hydrostatic or hydrodynamic type.

The upper support shoe 22 shown in FIGS. 1 and 5 is a one piece shoe which extends for essentially the entire effective face length of the roll shell. Its support face contains at least four cavities, or recessed pockets, 23,23',23",23"' which receive pressurized hydraulic fluid via throttling conduits 25,25',25",25"' linking these pockets with the chamber 18 beneath the piston end 20 of the support shoe 22. Lower support shoe 24 has similar pockets 27,27' in its face which are supplied with hydraulic lubricating fluid via similar conduits 29 from a similar chamber 19.

As shown more clearly in FIG. 1, the support shaft 12 has laterally extending side bodies 34,36 which extend substantially perpendicular to the nip plane. They are used in conjunction with longitudinally extending positioning pistons bearing against guide shoes, as will be described subsequently.

Near either end of the roll shell, spaced inwardly thereof, are a pair of opposed guide shoes 38,40 and 42,44. These guide shoes have corresponding pairs of parallel planar guide surfaces 46,48 and 50,52 for guiding the guide shoes on guide surfaces 47,49 and 51,53, respectively, which are formed in the support shaft and are arrayed in planes parallel with the nip plane. A guide shoe conduit within the support shaft 12 is lined with each of the guide shoes 38,40,42,44 by hydraulic feed lines to supply pressurized hydraulic fluid to each of the guide shoes from a pressurized source, such as a pump (not shown). Each of the guide shoes has a guide face 57 in which a plurality of recessed pockets 58 are formed. This face 57 functions as a roll shell stabilizing surface for rotatably and positionably stabilizing the roll shell during its translational movement relative to the shaft.

Each of the guide shoes 38,40,42,44 has axial thrust hydrostatic bearing pads 100,101,102,103 which bear against thrust disks 76 and 76', which are disposed concentric with the roll shell and fixed relative thereto by pins 78.

Figure 6:
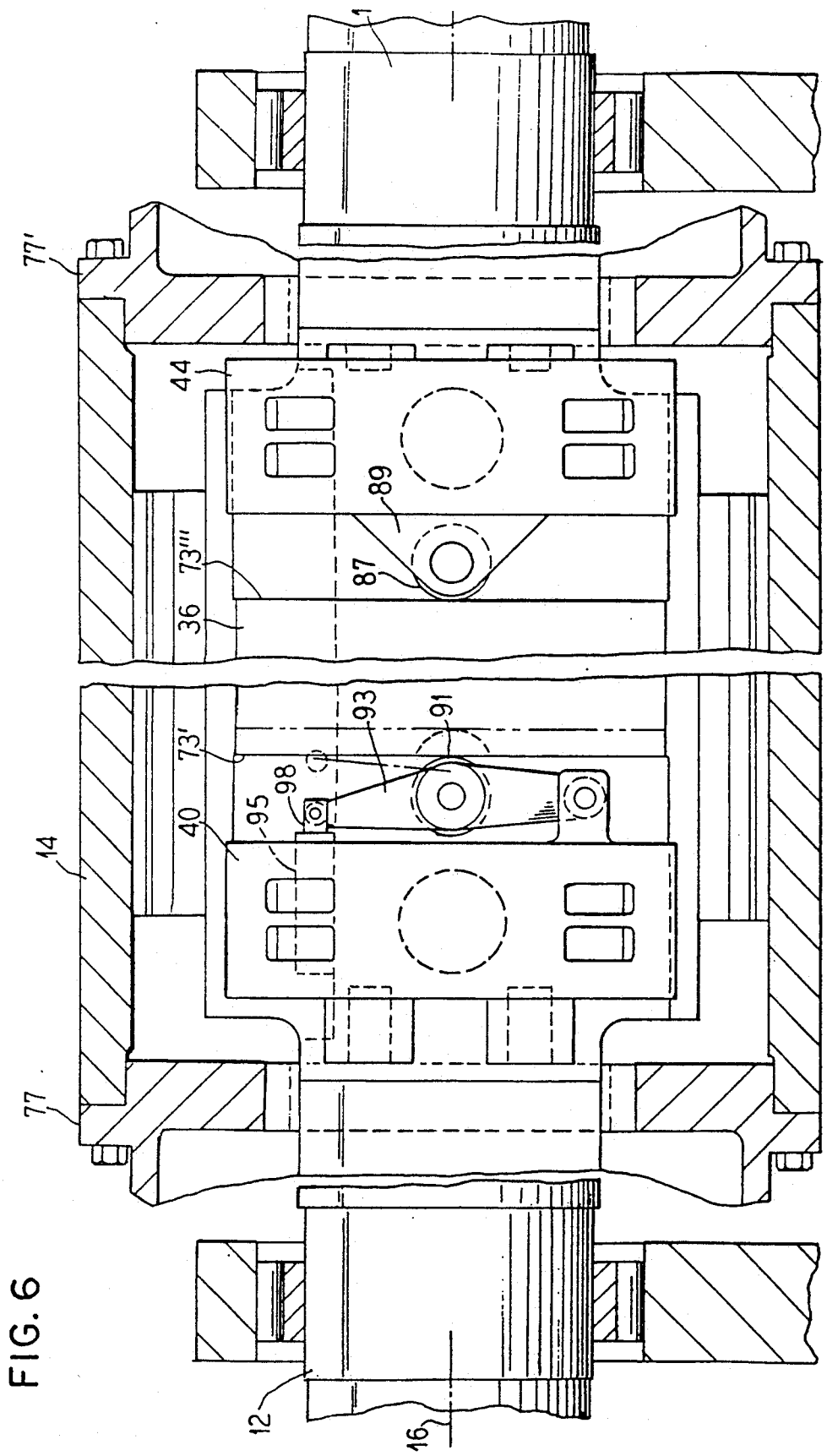
FIG. 6 is a sectional view taken through the axis of the controlled deflection roll of FIG. 1 taken substantially along line VI—VI of FIG. 1.

In FIGS. 1 and 6, a mechanism for obtaining positive control of the axial relative position between the shell 14 and the shaft 12 is shown.

Mounted on the opposed guide shoes 42 and 44 are fixed rollers 86 and 87, rotatably supported between brackets 88,89, respectively. These rollers bear against the axial thrust stabilizing surfaces 73" and 73"'. The rollers will roll against the surfaces allowing for radial movement of shell 14 relative to the shaft 12, and the rollers' location is fixed relative to the axial position of the roll shell. Such radial movement of the roll shell occurs, for example, when the roll shell is moved translationally into nipping engagement with its mating roll.

To ensure continued contact between the rollers 86 and 87 and their support surfaces 73" and 73"', biased rollers apply a force in the opposite direction to the laterally extending side bodies 34 and 36. The side bodies have axial thrust stabilizing surfaces 73 and 73' which extend at right angles to the nip line, as do the surfaces 73" and 73"'. The surfaces 73 and 73' are engaged by rollers 90 and 91 which are biased toward the surfaces 73 and 73'. On each form illustrated, the roller 90 and 91 is carried on a rocker arm 92 and 93. The rocker arm provides a mechanical advantage and is pivoted by a force means of the type shown in FIGS. 2, 3 or 4.

In FIG. 2, the biasing force for the rocker arm 93 for the roller is provided by a piston 94 slidable in the cylinder 95, the piston being connected by a piston rod 98 to the upper end of the rocker arm 93. Controlled pressure is supplied by a pressure means shown schematically by a pump at 96.

In FIG. 3, the biasing force is applied by a spring 97 which pushes against the base of a piston 94 connected by a piston rod 98 to the rocker arm 93.

In FIG. 4, there is a combination for force means including the pump 96 which applies fluid pressure to the piston 94, and this is augmented by a spring 97.

By the use of the springs shown in FIGS. 3 and 4, the roll shell 14 will remain axially centered on the shaft even when the machine is shut down and no fluid pressure is available.

The rocker arm 93 will continue to apply a force to the right as shown in FIGS. 1 and 6, ensuring constant rolling contact between the roller 91 and the surface 73', and the rocker arm 92 will likewise continue to apply a force between the roller 90 and the surface 73. This continues to ensure that the shaft will remain at a fixed position due to continued contact between the fixed rollers 86 and 87 with the surfaces 73" and 73"' with the rollers being in a fixed axial position relative to the roll shell and the surfaces 73" and 73"' being in a fixed position relative to the shaft.

In operation, the controlled deflection roll operates in a usual manner rotating in contact with an opposed surface, or support, such as a mating roll 4 providing a pressure nip, which nip is controlled by the force applied via the fluid pockets in the shaft 12. Axial misalignment is prevented by continued contact of the rollers 86,87,90,91 with the shaft surfaces which extend at right angles to the nip line. If the nip line faces upwardly, the surfaces are vertical, thus allowing the shell to move radially relative to the roll shaft. In other words, the shaft surfaces 73,73',73",73"' extend in a direction parallel to the radial movement of the shell. The fixed rollers 86,87 and the rollers 90,91 mounted on the rocker arms 93, which provide a mechanical advantage, stabilize the relative elements and provide for axial misalignment and differential linear expansion between the roll shell and center shaft. This is accomplished without the requirement of pistons with hydrostatic bearing pads as has heretofore been necessary. That eliminates the necessity of power requirements to provide the necessary fluid flow. The rollers are mounted on each stabilizing shoe and are biased in rolling contact against an extension of the stationary center shaft. A roller at one end is fixed, while the roller at the opposite end is loaded, such as with a spring, or with a hydraulic arrangement, or with a spring and hydraulic arrangement, all of which are linked with a rocker arm. The spring may be used as a preload device to maintain the axial location when the hydrostatic system is not used.

The pivoted rocker arm and roller arrangement accommodates both radial (i.e. translational) movement of the roll shell relative to the roll shaft when the roll is actuated into nipping engagement and disengagement with its mating roll, and bending of the center shaft occurs when the roll shell is actuated to maintain a substantially straight line of nip contact with its mating roll while the roll shaft bends under the total load and weight which otherwise would, at least partially, be transmitted to the roll shell.

The hydrostatically lubricated axial bearing pads are stationary relative to their respective guide shoes and are, therefore, of a simple, inexpensive design. The maintain the guide shoes in an axially fixed position in one direction relative to the ends of the roll shell through their bearing contact with the surfaces 75,75',75",75"' of the thrust disks 100, 101,102,103. The fixedly mounted and pivotally mounted roller arrangements control relative movement between the roll shell and the roll shaft in the opposite direction.

The roll 10 is rotatably mounted about the shaft by means of a collar 77 which forms an extension concentric with the roll shell and attached thereto with bolts 80. The collar is rotatably mounted onto a head 84 with bearings 82. Since the head is concentric with, but spaced from, the roll shaft, the entire rotational support apparatus for the roll shell can be moved translationally relative to the roll shaft.

Thus, it will be seen that the roll has been provided an improved arrangement which meets the objectives and advantages above set forth and provides structure which is completely independent of hydraulic power for achieving the axial alignment between the roll shell and the shaft. The arrangement accommodates for thermal expansion and provides misalignment with simple equipment which is capable of long operating life without tension.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A self-loading type of controlled deflection roll for engaging another roll along a nip line comprising, in combination:
   a stationary roll shaft having a longitudinal axis extending along a nip plane, said shaft including guide surfaces on two sides thereof, and axial thrust stabilizing support surfaces, both sets of surfaces on either side of the nip plane with the stabilizing support surfaces extending transversely of the nip plane;
   a roll shell, having inner and outer cylindrical surfaces, disposed about the shaft and defining, with the shaft, a space between the shaft and the inner surface of the shell;
   support shoe means mounted on the shaft and disposed in the space to supportingly engage the inner surface of the shell and move the shell translationally relative to the shaft in the nip plane through the longitudinal axis and nip into, and out of, nipping engagement with the opposing support;
   guide shoe means for use in conjunction with the guide surfaces on both sides of the roll shaft, each guide shoe means having a support surface and a stabilizing surface with the support surface positioned for sliding movement on a shaft guide surface and the stabilizing surface positioned for sliding engagement with the inner surface of the roll shell;
   an axial alignment-maintaining means between the roll shaft, the roll shell and the guide shoe means, the axial alignment-maintaining means including first and second roller means having rollers, with the rollers engaging the shaft support surfaces for controlling relative axial movement between the roll shell and shaft.

2. A controlled deflection roll for engaging another roll along a nip line, constructed in accordance with claim 1:
   wherein said rollers are mounted to said guide shoe means.

3. A controlled deflection roll for engaging another roll along a nip line, constructed in accordance with claim 2:
   wherein the shaft support surfaces are disposed in opposed array with the rollers.

4. A controlled deflection roll for engaging another roll along a nip line, constructed in accordance with claim 3:
   including piston and cylinder means supporting at least one of said first and second roller means.

5. A controlled deflection roll for engaging another roll along a nip line, constructed in accordance with claim 2:
   wherein the rollers are supported on a rocker arm.

6. A controlled deflection roll for engaging another roll along a nip line, constructed in accordance with claim 5:
   wherein the rocker arm is urged in a direction to maintain the roller in contact with the shaft support surface by piston and cylinder means.

7. A self-loading type of controlled deflection roll for forming a controlled pressure nip with another member comprising, in combination:
   a roll shell rotatable on an axis with inner and outer cylindrical surfaces for forming a pressure nip with an opposing member along a nip line;
   a load supporting stationary roll shaft axially supportingly extending through the shell;
   pressure means between the shaft and roll shell for obtaining a controlled pressure nip; and
   an axial force-applying alignment-maintaining means between the roll shell and shaft, including a shaft support surface extending transversely of the nip line, and roller means for engagement with said shaft support for accommodating transverse movement of the shaft relative to the roll shell while controlling relative axial movement between the roll shell and shaft.

8. A controlled deflection roll for forming a controlled pressure nip with another member, constructed in accordance with claim 7:
   wherein said axial alignment-maintaining means includes first and second roller means at opposite ends of said shaft in opposed relationship and bearing against corresponding shaft support surfaces.

9. A controlled deflection roll for forming a controlled pressure nip with another member, constructed in accordance with claim 7:
   including pairs of support surfaces extending transversely of the nip line on the shaft facing in opposite directions and roller means axially supported on the roll shell against the shaft support surfaces for controlling relative axial movement, but accommodating bending movement and radial movement of the shaft relative to the roll shell.

10. A controlled deflection roll for forming a controlled pressure nip with another member, constructed in accordance with claim 9:
    wherein the roller means comprises first and second roller means, one of said roller means is stationary and the other of said roller means is loaded by force means.

11. A controlled deflection roll for forming a controlled pressure nip with another member, constructed in accordance with claim 7:
    wherein said axial alignment-maintaining means includes disks mounted to the roll shell and having disk surfaces axially facing the shaft support surfaces, and wherein the roller means includes first and second opposing rollers rolling on the shaft support surfaces which extend transversely of the nip line;

one of said rollers being stationary and the other of said rollers having force supplying means.

12. A controlled deflection roll for forming a controlled pressure nip with another member, constructed in accordance with claim 11:

wherein said roll force supplying means comprises a rocker arm.

13. A controlled deflection roll for forming a controlled pressure nip with another member, constructed in accordance with claim 7:

wherein said roll force supplying means comprises a fluid loaded piston cylinder.

14. A controlled deflection roll for forming a controlled pressure nip with another member, constructed in accordance with claim 7:

wherein said roll force supplying means is a spring.

* * * * *